Oct. 24, 1961  N. H. NYE  3,005,370
FILM PERFORATING APPARATUS
Filed Feb. 10, 1959  2 Sheets-Sheet 1

INVENTOR.
NORMAN H. NYE
BY
Oldham & Oldham
ATTYS.

United States Patent Office 3,005,370
Patented Oct. 24, 1961

3,005,370
FILM PERFORATING APPARATUS
Norman H. Nye, Cuyahoga Falls, Ohio, assignor to Pen-Mac-Nye Company, Akron, Ohio, a corporation of Ohio
Filed Feb. 10, 1959, Ser. No. 792,344
4 Claims. (Cl. 83—345)

This invention relates to apparatus for perforating plastic films, for example, those of vinyl, polyethylene, and the like, such perforated film being required in certain packaging and other operations.

It is the general object of the invention to provide relatively simple, inexpensive, durable and easily operated apparatus for rapidly, effectively, and efficiently perforating thin plastic film.

Another object of the invention is the provision of apparatus of the character described wherein fish tail pointed pins are driven in turn at least part way through a film tensioned over a pair of resiliently positioned rotating discs, at least part of the cutting or perforating operation being performed by cutting edges of the pin working against the shoulders of the discs.

The foregoing objects of the invention, and other objects which will become apparent as the description proceeds are achieved by the provision of a film perforating apparatus including a rotary shaft, a pin extending radially of the shaft and having a V-notched end defining double fish tail cutting edges which are in alignment in the direction of rotation of the shaft, a pair of discs separated to define a groove receiving the end of the pin, means resiliently mounting the discs for rotation, means rotating the shaft to present the end of the pin periodically to the groove between the discs, the edges of the discs resiliently engaging laterally in cutting relation with the cutting edges of the pin at least towards the bottom of the V-notch thereof, the speed of the pin and the discs being substantially the same, and means to supply film between the discs and pin at a speed substantially equal thereto.

Figure 1:
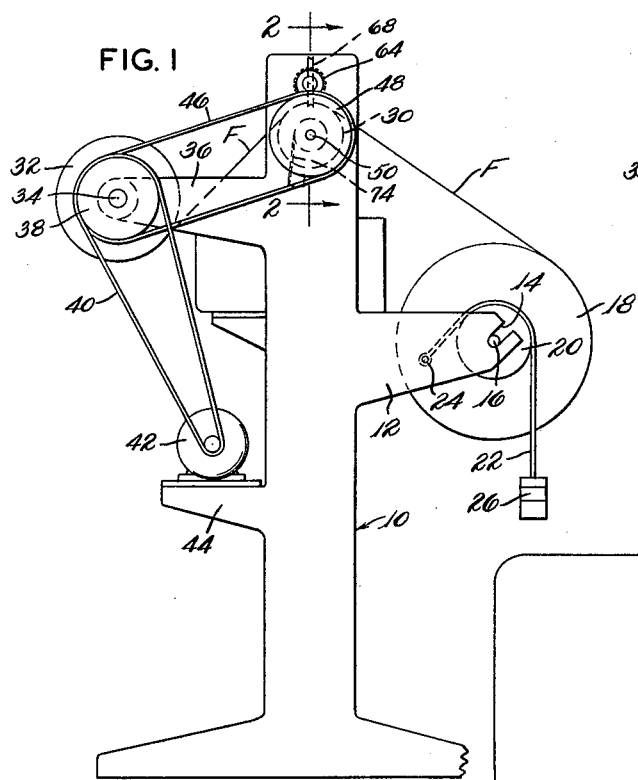
Figure 5:
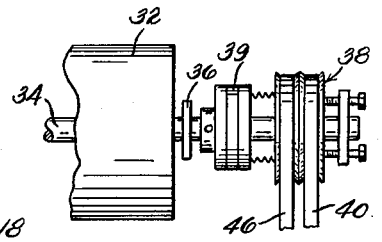
Figure 4:
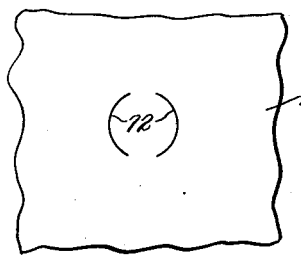
Figure 3:
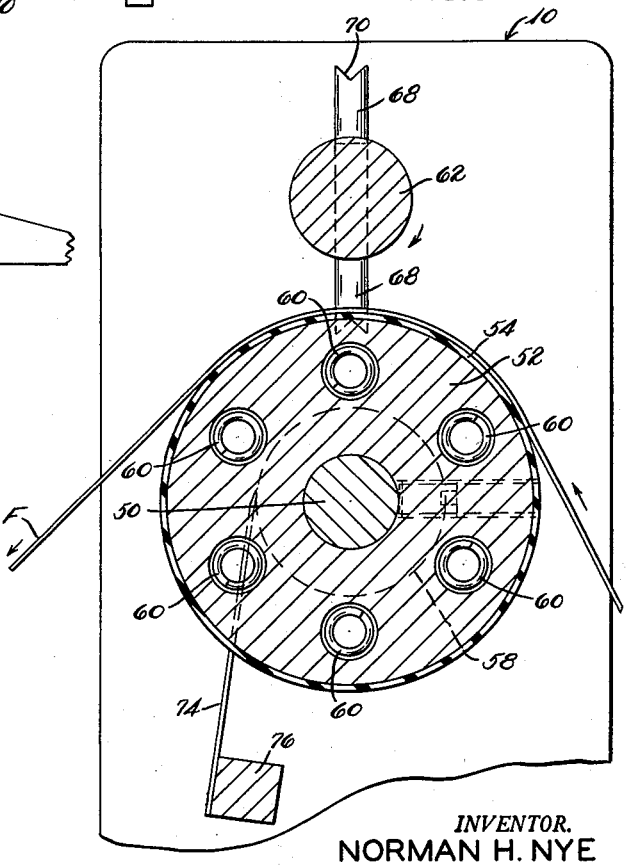
Figure 2:
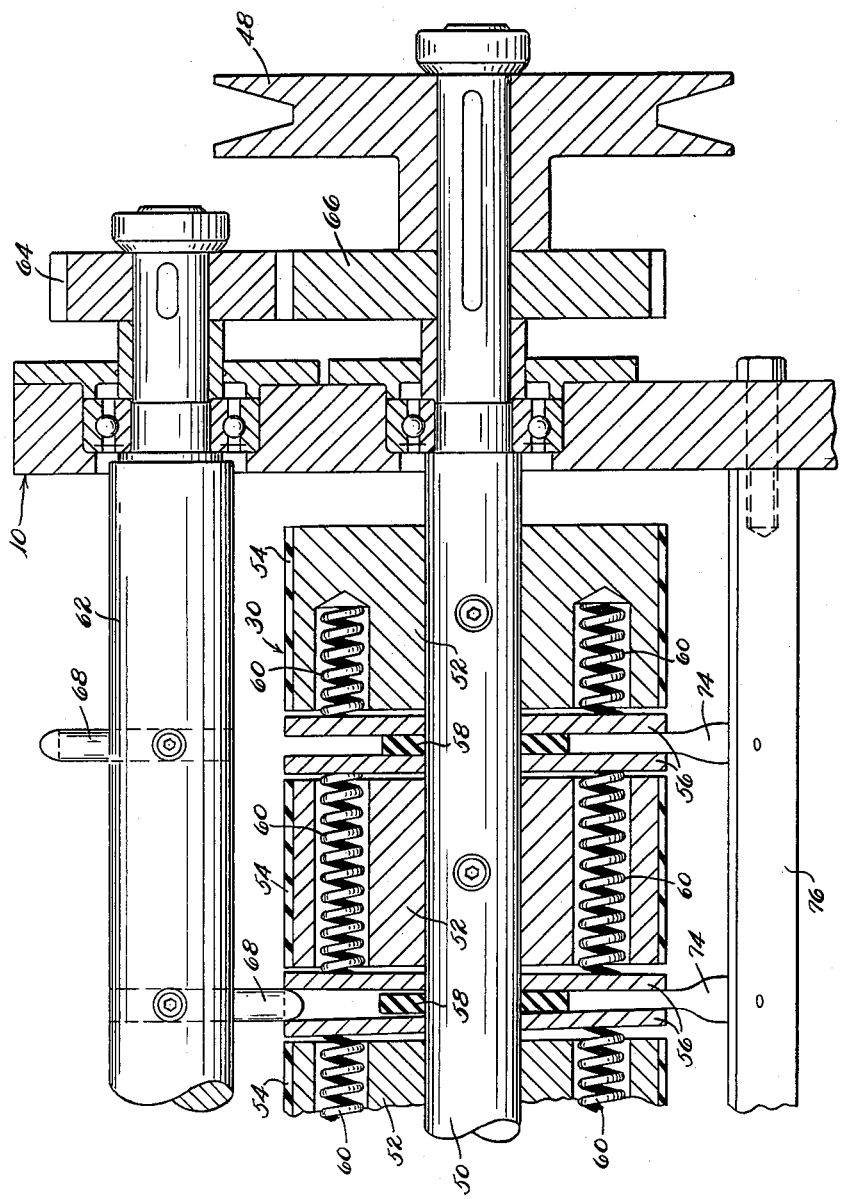

For a better understanding of the invention reference should be had to the accompanying drawings wherein
FIG. 1 is a side elevation of one embodiment of apparatus incorporating the principles of the invention;
FIG. 2 is an enlarged fragmentary vertical cross sectional view of a portion of the pin and disc mechanism of FIG. 1 and taken on line 2—2 thereof;
FIG. 3 is a vertical cross-sectional view taken on line 3—3 of FIG. 2;
FIG. 4 is a fragmentary enlarged view of a portion of film illustrating a partially cut perforation therein; and
FIG. 5 is a fragmentary elevational view of the slipping friction drive for the film windup roll.

Referring more particularly to the drawings, the numeral 10 indicates a frame having a pair of laterally spaced horizontal arms 12 removably receiving in inclined notches 14 an axle 16 on which is wound a roll 18 of plastic film, such as vinyl, polyethylene, and the like. A brake drum 20 secured to the axle 16 at one end of the roll 18 acts in conjunction with a braking strap 22 to hold back and tension the film F as it is pulled off the roll 18. The strap 22 is anchored at one end 24 to the arms 12 and is provided with an adjustable weight 26 at its other end.

The film F passing from the roll 18 passes over an arcuate portion of a roll 30 and is wound up on a roll 32 carried by an axle 34 journalled in a pair of laterally spaced arms 36 integral with the frame 10.

The axle 34 for the roll 32 is driven in one of two manners. In the preferred embodiment of the invention a double V-belt pulley 38 is provided on the axle 34 and is connected thereto by a friction clutch 39, the pulley 38 being driven by V-belt 40 connected to the driving motor 42 mounted on brackets 34 on the frame 10. The V-belt pulley 38 has a second groove therein which drives through a belt 46 to a pulley 48 secured to the shaft 50 mounting the roll 30. This arrangement is such that the shaft 50 and roller 30 are driven at a constant speed during the entire operation of the perforating apparatus, and with the speed of the wind-up roll 32 gradually decreasing as the diameter of the roll 32 builds up, the friction clutch between the shaft 34 and the pulley 38 allowing the gradual decrease of speed of the roll 32. It will be understood that the initial speed of the roll 32 and the friction of the driving clutch is such as to provide a substantially constant uniform tension at a windup speed on the film F as it leaves the roll 30.

The second manner of driving the roll 32 is to secure the pulley 38 to the shaft 34 and drive the axle 34 from the motor 42 and eliminate the belt 46 and pulley 48. This means that the speed of the film F through the perforating apparatus gradually increases as the diameter of the roll 32 builds up. This change of speed of the perforating operation is normally not objectionable.

Turning now to a more detailed consideration of the construction of the roll 30, and having particular reference to FIGS. 2 and 3, the roll 30 includes shaft 50 upon which V-belt pulley 48 is mounted. A plurality of axially short roll segments 52 are secured in axially spaced relation along the shaft 50, with each roll segment 52 being provided with a rubber covering 54.

Mounted in the grooves formed by the axially separated roll segments 52 are a pair of metal discs 56 which are separated by a spacing washer 58 which may be made of rubber or other resilient material to facilitate the tilting movement of the disc, as hereinafter described, but which may also be made of metal inasmuch as the remaining construction of the roll will normally allow adequate tilting movement of the disc. As illustrated in the drawing, each of the roll segments 52 is formed with axially parallel circumferentially spaced recesses which receive compression springs 60 acting to hold the discs 56 resiliently towards each other and against the washer 58, but permitting tilting movement of the discs apart against the compression of the springs (see left-hand side of FIG. 2) when the piercing pins, hereinafter described, pierce down between the discs. The clearance between the discs and the ends of the roll segments 52 has been somewhat exaggerated in the drawings for purposes of clarity, this clearance being only a few thousandths of an inch in actual practice.

Positioned parallel to the shaft 50 is a shaft 62, both the shafts 50 and 62 being suitably journalled in the upright parallel portions of the frame 10, and with the shaft 62 being provided with a spur gear 64 which engages with spur gear 66 secured to shaft 50 adjacent V-belt pulley 48. The shaft 62 carries axially and circumferentially spaced piercing pins 68 which are adapted to extend down between the discs 56 in the manner illustrated in the drawings upon rotation of the shafts 50 and 62 by the pulley 48.

Each of the pins 68 is formed with a V-notch 70 (see FIG. 3) to provide a double-pointed pin end, which may be described as a fish tail end, the double points of each pin 68 being in alignment of the direction of rotation of the pins 68. FIG. 4 illustrates slits 72 as made by the double cutting edges of a piercing pin 68, the illustration in FIG. 4 showing the slits 72 only partially made as the piercing pin 68 begins to move down through the film F. It will be understood that as the piercing pin 68 continues to move down into the film F that the slits 72 are continued by the engagement of the side of the discs 56 with at least the bottoms of the V notches 70 of the pin 68 so that a complete round perforation is cut from the film F by each piercing pin 68.

Spring fingers 74 are mounted on a cross bar 76 extending between the frame uprights 10, and with the spring fingers 74 serving to pick out any perforations cut by the pin 68 and tending to drop down between the discs 56 so that the perforations fall into a scrap collector box not shown.

The operation of the apparatus will be evident from the foregoing description. The number of perforations cut in the film F will depend upon the number and placement of the pins 68. The movement of the film F through the apparatus from the let-off roll 18 to the take-up roll 32 is relatively rapid so that the piercing action of the pins 68 upon the tensioned film supported between each pair of disks 56 is in the nature of a blow rather than a comparatively slow cutting action. For example, speeds of over 500 feet a minute are normally used and preferably speeds of two or three times this amount.

While in accord with the patent statutes, a certain best known embodiment of the invention has been illustrated and described, it is be particularly understood that the invention is not limited thereto or thereby but that its scope is defined in the appended claims.

What is claimed is:

1. Apparatus for perforating films including a roll, means for moving the film around an arcuate portion of the roll under tension, a shaft positioned parallel to the roll, a plurality of double fish tail round pointed piercing pins carried by and extending radially of the shaft and of a length to extend within the periphery of the roll, means for rotating the shaft so that the engaging speeds of the roll and pins is substantially the same, said roll being formed from a plurality of axially short roll segments spaced axially apart to provide grooves in alignment with the pins, a pair of discs of a diameter equal to the diameter of the roll mounted in each groove and defining the side walls thereof, resilient means positioned between the discs and to the outside of the discs for holding the discs for limited axial movement to and from the side of the pins but allowing relative rotary movement of the discs with respect to each other and the roll segments, the double points of each pin being circumferentially aligned in the direction of their rotation, the edges of the discs cutting against at least the bottom portions of the double fish tails of the pointed pins, and resilient finger means extending between each pair of discs to direct the cut-out perforations out of the grooves.

2. Apparatus for perforating films including a roll, means for moving the film around an arcuate portion of the roll under tension, a shaft positioned parallel to the roll, a plurality of double fish tail round pointed piercing pins carried by and extending radially of the shaft and of a length to extend within the periphery of the roll, means for rotating the shaft so that the engaging speeds of the roll and pins is substantially the same, said roll being formed from a plurality of axially short roll segments spaced axially apart to provide grooves in alignment with the pins, a pair of discs of a diameter equal to the roll segments mounted in each groove and defining the side walls thereof, and resilient means positioned between the discs and to the outside of the discs for holding the discs for limited axial movement to and from the side of the pins but allowing relative rotary movement of the discs with respect to each other and the roll segments, the double points of each pin being circumferentially aligned in the direction of their rotation, the edges of the discs cutting against at least the bottom portions of the double fish tails of the pointed pins.

3. Apparatus for perforating films including a roll, means for moving the film around an arcuate portion of the roll under tension, a shaft positioned parallel to the roll, a plurality of round pointed piercing pins having circular cutting edges carried by and extending radially of the shaft and of a length to extend within the periphery of the roll, means for rotating the shaft so that the engaging speeds of the roll and pins is substantially the same, said roll being formed from a plurality of axially short roll segments spaced axially apart to provide grooves in alignment with the pins, a pair of discs mounted in each groove and defining the side walls thereof, and means resiliently holding the discs for limited axial movement to and from the side of the pins but allowing relative rotary movement of the discs, the edges of the discs cutting against the circular cutting edges of the pointed pins to effect the punching out of round perforations from the film.

4. Apparatus for perforating films including a roll, means for moving the film around an arcuate portion of the roll under tension, a shaft positioned parallel to the roll, a plurality of round pointed piercing pins having circular cutting edges carried by and extending radially of the shaft and of a length to extend within the periphery of the roll, means for rotating the shaft so that the engaging speeds of the roll and pins is substantially the same, said roll being formed from a plurality of axially short roll segments spaced axially apart to provide grooves in alignment with the pins, a pair of discs mounted in each groove and defining the side walls thereof, means resiliently holding the discs for limited axial movement towards each other, means resiliently holding the discs for limited axial movement away from each other, the edges of the discs cutting against the circular cutting edges of the pointed pins to cut circular holes in film.

References Cited in the file of this patent

UNITED STATES PATENTS

| 164,289 | Francis | June 8, 1875 |
| 371,736 | Burton | Oct. 18, 1887 |
| 1,601,696 | Trautman | Sept. 28, 1926 |
| 1,937,499 | Adams | Dec. 5, 1933 |

FOREIGN PATENTS

| 823,694 | Germany | Dec. 6, 1951 |